(12) United States Patent
Gardos

(10) Patent No.: US 7,345,684 B2
(45) Date of Patent: Mar. 18, 2008

(54) PERCEPTUALLY BASED DISPLAY

(75) Inventor: Thomas R. Gardos, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 30 days.

(21) Appl. No.: 10/927,719

(22) Filed: Aug. 27, 2004

(65) Prior Publication Data

US 2005/0030322 A1 Feb. 10, 2005

Related U.S. Application Data

(63) Continuation of application No. 09/104,828, filed on Jun. 25, 1998, now abandoned.

(51) Int. Cl.
  *G06F 3/038* (2006.01)
(52) U.S. Cl. ....................... 345/204; 345/671
(58) Field of Classification Search ........ 345/127–131, 345/147, 156, 204, 472.1, 472.2, 670, 671
See application file for complete search history.

(56) References Cited

U.S. PATENT DOCUMENTS 5,576,732 A * 11/1996 Minakuchi et al. ......... 345/667
5,590,060 A * 12/1996 Granville et al. ........... 702/155
5,635,951 A *  6/1997 Takahashi ................... 345/671
5,686,940 A * 11/1997 Kuga ........................... 345/156

FOREIGN PATENT DOCUMENTS

JP   01-277286   * 11/1989
JP   03-1896683  *  8/1991

* cited by examiner

*Primary Examiner*—Richard Hjerpe
*Assistant Examiner*—Kimnhung Nguyen
(74) *Attorney, Agent, or Firm*—Trop, Pruner & Hu, P.C.

(57) ABSTRACT

A display technique determines the desired size of an object to be displayed (using a distance dependent measure such as visual arc angle), determines the distance between the display unit and a user, and adjusts the size of the displayed object based on the desired size and measured distance. By repeatably determining the distance between the user and display unit, each displayed object may be dynamically adjusted to maintain an approximately constant size display, from the users point of view. The display technique may be implemented in hardware, software, or a combination of hardware and software. One benefit of the display technique is that eye strain can be reduced while working at a computer display unit.

18 Claims, 3 Drawing Sheets

PERCEPTUALLY BASED DISPLAY

This application is a continuation of prior Application No. 09/104,828, filed on Jun. 25, 1998 now abandoned.

BACKGROUND

The invention relates generally to the control and display of visual information on a computer system display device.

In current windows-based computer display systems, font and window display sizes are proportional to the viewable area of a display unit. For example, font and display window sizes are generally specified in terms of "points," where a point is approximately 1/72 of an inch. In many windows-based computer display systems the number of pixels (e.g., size) used to display a font letter or window remains constant regardless of how far or near the user is to the display. From a user's perspective, however, text and other graphical objects appear to change size as the user's distance from the display unit changes. Thus, it would be beneficial to provide a mechanism to dynamically adjust the size of graphical objects based on a user's distance from a display unit.

SUMMARY

In one aspect, the invention provides a method to dynamically adjust the size of an object displayed on a display unit. Illustrative objects include fonts and program application windows. The method includes determining the distance between a display unit and a user, and adjusting the size of the displayed object based on the measured distance. A desired display size may also be identified—generally in terms of a distance-dependent measure such as visual arc angle. The method may further include the capability to repeatably adjust the displayed object's size, e.g., once every second, without user intervention. In one embodiment, a device driver (using application programming interface calls) communicates between the distance detector and an application to adjust the size of the displayed object. Instructions embodying a method in accordance with the invention may be stored in any media that is readable and executable by a computer system.

In other aspects, the invention provides an apparatus and computer system capable of providing dynamic control of a displayed object's size based on a measured distance between the display unit and the user. The distance measuring device may be a video device such as a video camera(s) or a charged coupled device(s) and may be an integral part of the computer system or a stand-alone device such as an adapter card.

DETAILED DESCRIPTION

Techniques (including methods and devices) to dynamically adjust the size of objects displayed on a computer system display unit are described. The following embodiments of this inventive concept are illustrative only and are not to be considered limiting in any respect.

Figure 1:
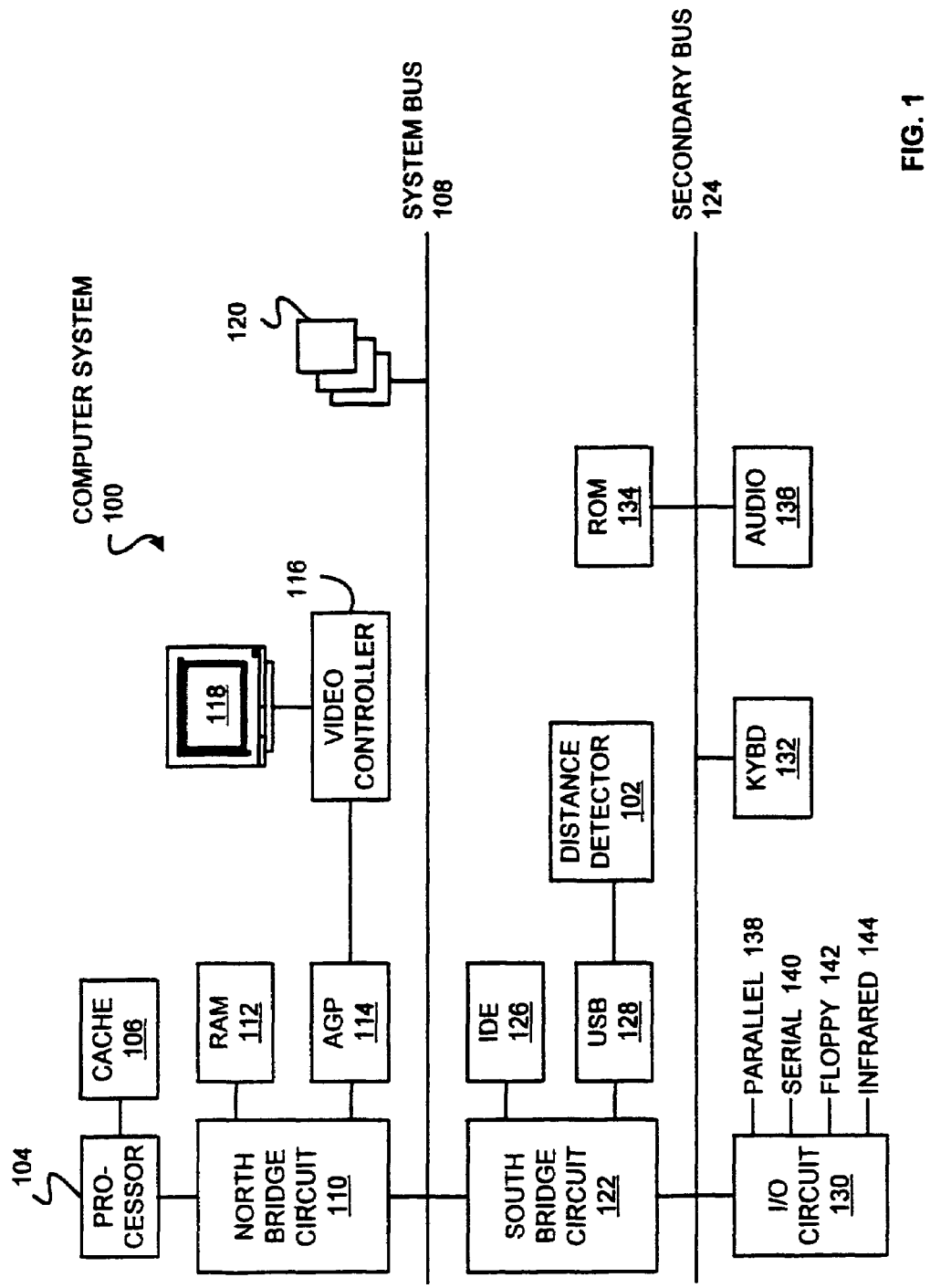
FIG. 1 shows an illustrative computer system that may be used to dynamically adjust the size of displayed objects.

Referring to FIG. 1, an illustrative computer system 100 having a distance detector 102 is shown. Computer system 100 includes host processor 104 and associated cache memory 106 connected to system bus 108 through bridge circuit 110. Illustrative host processors 104 include the PENTIUM® II processor, the PENTIUM® PRO processor, and the 80×86 families of processors from Intel Corporation. One illustrative bridge circuit 110 is the 82443LX PCI-to-AGP controller manufactured by Intel Corporation.

Bridge circuit 110 provides an interface to connect system random access memory (RAM) 112 and accelerated graphics port (AGP) 114 devices, and one or more expansion slots 120. Video controller 116 and associated display unit 118 may be coupled through AGP port 114. Expansion slots 120 may be personal computer memory card international association (PCMCIA) slots.

Bridge circuit 122 connects system bus 108 to secondary bus 124, while also providing integrated device electronics (IDE) 126 and universal serial bus (USB) 128 interfaces. Common IDE devices include magnetic and optical disk drives. Distance detector 102 may be connected through a USB port 128 or, alternatively, to system bus 108 or secondary bus 124 through conventional means. Also connected to secondary bus 124 are input-output (I/O) circuit 130, keyboard controller (KYBD) 132, system read only memory (ROM) 134, and audio device 136. One illustrative bridge circuit 122 is the 82371AB PCI-to-ISA/IDE controller made by Intel Corporation. Input-output circuit 130 can provide an interface for parallel 138 and serial 140 ports, floppy disks 142, and infrared ports 144.

Figure 2:
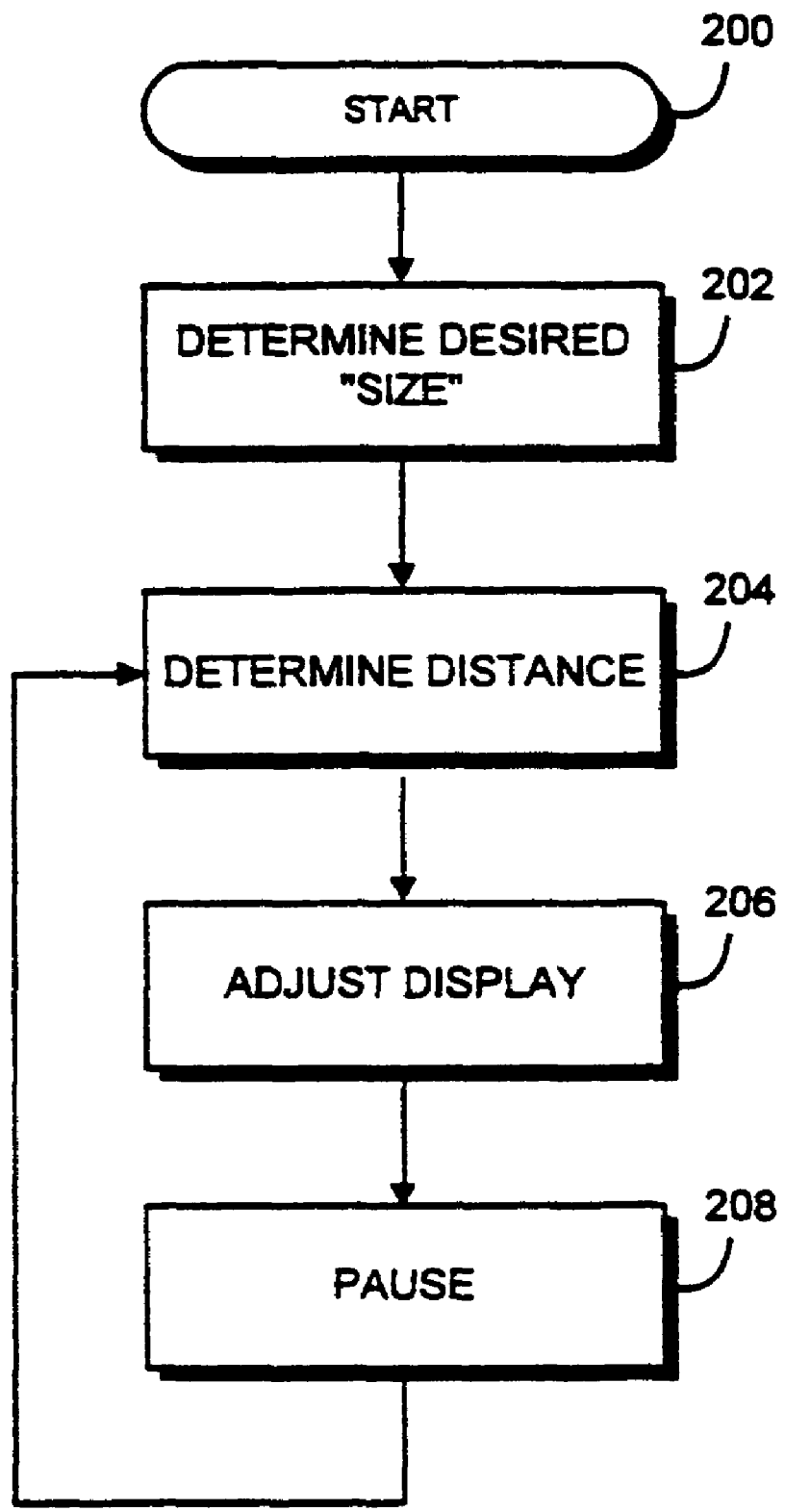
FIG. 2 shows a method in accordance with one embodiment of the invention to dynamically adjust the size of displayed objects.

An illustrative method for using information provided by distance detector 102 to dynamically adjust the size of a displayed object is shown in FIG. 2. When invoked (e.g., at computer system 100 startup, step 200), computer system 100 determines the desired size of a font or window (step 202) and the distance between distance detector 102 and a viewer (step 204). With this information, the size of a displayed object may be adjusted (step 206). Steps 204 and 206 may be repeated after a specified pause (step 208).

Users may specify a "desired size" in terms of visual arc angle which may be stored in any convenient non-volatile memory accessible by processor 104. For example, a value representative of the user's desired size may be stored in CMOS type RAM 112, on a magnetic hard disk (e.g., coupled through IDE port 126), or a floppy disk drive 142. Alternatively, a user may be prompted to provide this information either at startup time or whenever a perceptually-based display capability is invoked.

Figure 3:
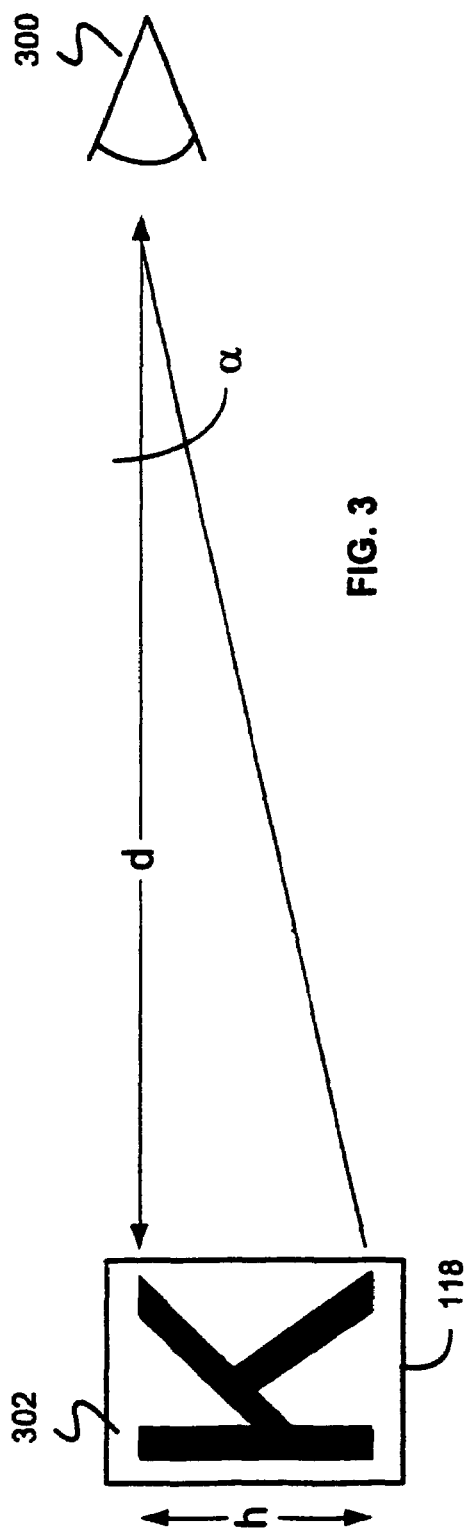
FIG. 3 shows an illustrative technique to calculate a target object size in accordance with the invention.

FIG. 3 and Table 1 illustrate the correspondence between the specified visual angle (size), the distance between the user/viewer, and a displayed font size. For example, if the specified visual angle α is 0.2 degrees, and user 300 is four feet (d) from display unit 118, font 302 (h) should be approximately 12 points. If user 300 moves to a distance of six feet away from display unit 118 (i.e., d=72 inches), font 302 may be adjusted to approximately 18 points. This approach (see FIG. 2) allows a user to specify a relative viewing size which may be adjusted automatically as the user moves closer to and farther away from display unit 118. One benefit of this inventive concept is that eye strain can be reduced while working at a computer display unit. An alternative computational approach is shown in FIG. 4 and Table 2.

TABLE 1

Figure 4:
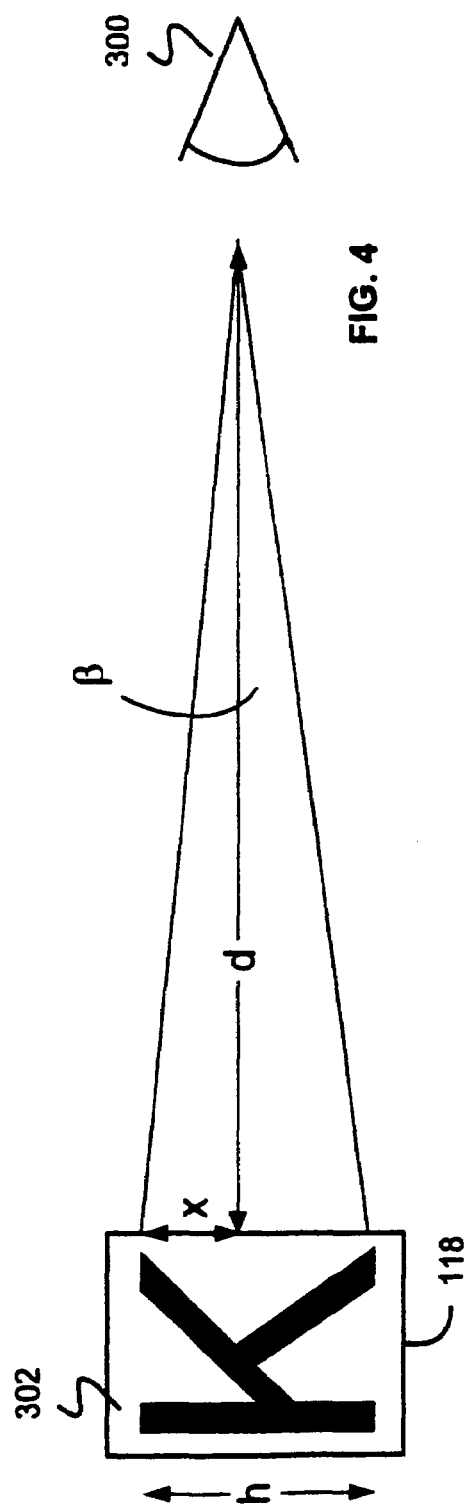
FIG. 4 shows another illustrative technique to calculate a target object size in accordance with the invention.

Correspondence Between Font Size, Distance, and a Specified Size (see FIG. 4)

$\tan(\alpha) = h/d$
$h = d \tan(\alpha)$
If d is measured in inches, then
$h' = 72 \, d \tan(\alpha)$
represents the font size(in points) that accommodates the specified visual arc angle $\alpha$.

TABLE 2

An Alternative Correspondence Between Font Size, Distance, and Specified Size(see FIG. 4)

$\tan(\beta) = h/d$
$x = h/2 = d \tan(\beta)$
$h = 2 \, d \tan(\beta)$
If d is measured in inches, then
$h' = 144 \, d \tan(\beta)$
represents the font size(in points) that accommodates the specified visual arc angle $\alpha$.

Distance detector 102 may be a video device, such as a charged coupled device or video camera, coupled through USB port 128 as shown in FIG. 1. In another embodiment, distance detector 102 may be coupled to system bus 108 or secondary bus 124 through an adapter card in a conventional manner. In alternative embodiments, distance detector 102 may be an infrared or acoustic range detector.

One technique to approximate distance d (see step 204 in FIG. 2 and FIG. 3) is to detect the user's pupils and use standard tables to translate the measured pupil size to an estimate of distance d. Further, the computational resources needed to perform these image processing tasks may be performed by processor 104 or by special purpose hardware and/or software on a dedicated device. The dedicated device may be one component of distance detector 102, a separate circuit contained on, for example, an adapter card, or a combination of these possibilities.

Display adjustment (step 206 in FIG. 2) may be performed by an operating system device driver. For example, a device driver can communicate with a user's word processing application by way of application programming interface (API) calls to increase or decrease the size of the application's font and/or window size. The specific API calls will generally depend upon the target application program (e.g., graphics application or word processing application).

After making one display adjustment in step 206 of FIG. 2, a specified time period may be allowed to elapse (step 208 of FIG. 2) before another adjustment is made. One means of generating a pause is to have the device driver (discussed above) periodically poll distance detector 102. Alternatively, distance detector 102 may generate interrupts at specified time periods which the device driver can then process. In either case, the amount of time between successive display adjustments may be short enough to capture relatively large movements by a user, but not so short as to require excessive processor resources (e.g., processor 104 time) or that exceed the ability of the image processing software and/or hardware to keep up with the video information provided by the device. One illustrative update period is one second.

Various changes in the materials, components, circuit elements, as well as in the details of the illustrated operational method are possible without departing from the scope of the claims. For example, instead of using a single video device, two video devices may be used to stereoscopically detect and measure the distance between the computer display unit and a user. Further, distance detector 102 may be embodied in a single hardware device such as a printed circuit board comprising discrete logic, integrated circuits, or specially designed application specific integrated circuits (ASIC). In addition, method steps of FIG. 2 may be performed by a computer processor executing instructions organized into a program module or a custom designed state machine. Storage devices suitable for tangibly embodying computer program instructions include all forms of non-volatile memory including, but not limited to: semiconductor memory devices such as EPROM, EEPROM, and flash devices; magnetic disks (fixed, floppy, and removable); other magnetic media such as tape; and optical media such as CD-ROM disks.

What is claimed is:

1. A method comprising:
   determining a distance between a display unit and a user;
   determining a desired font size of a displayed object, said desired font size based on a specified visual arc angle;
   increasing the font size of the displayed object if the determined distance increases to maintain said specified visual arc angle; and
   decreasing the font size of the displayed object if the determined distance decreases to maintain said specified visual arc angle.

2. The method of claim 1, wherein determining and increasing or decreasing are performed once every approximately one second.

3. The method of claim 1, wherein determining a desired font size comprises reading a data signal, representing a desired size value, which is indicated by a value specified for a visual arc angle, from a non-volatile memory.

4. The method of claim 1, wherein determining a distance between the display unit and the user comprises receiving information from a distance detector.

5. The method of claim 1 including increasing or decreasing the font size without changing the viewing window.

6. An apparatus comprising:
   a display unit;
   a distance detector to indicate the distance between the display unit and a user; and
   a circuit, operatively coupled to the display unit and the distance detector, to increase a font size of a displayed object if the distance increases to maintain a specified visual arc angle, and decrease the font size of the displayed object if the distance decreases, the increase in font size and the decrease in font size to maintain said specified visual arc angle.

7. The apparatus of claim 6, wherein the circuit comprises a device driver.

8. The apparatus of claim 7 wherein the device driver communicates with a particular application to increase and decrease the font size.

9. The apparatus of claim 8 wherein the device driver communicates with a word processing application program.

10. The apparatus of claim 9 wherein the device driver communicates with the word processing application program through the use of an application programming interface.

11. The apparatus of claim 6 further comprising:
memory coupled to the circuit and having stored therein a value representative of the desired size.

12. The apparatus of claim 11, wherein the memory is non-volatile memory.

13. The apparatus of claim 6 wherein the visual arc angle is specified by a user of the apparatus.

14. An article comprising a machine-readable storage medium containing instructions that, if executed, enable a system to:
- determine a distance between a display unit and a user;
- determine a desired font size of a displayed object, said desired font size based on a given visual arc angle;
- increase the font size of the displayed object without changing the given visual arc angle if the determined distance increases; and
- decrease the font size of the displayed object without changing the given visual arc angle if the determined distance decreases, the font size of the displayed object to appear to the user as remaining relatively constant if the distance between the display unit and the user changes.

15. The article of claim 14, further comprising instructions that, if executed, enable the system to periodically adjust the size of the displayed object.

16. The article of claim 15, further comprising instructions that, if executed, enable the system to periodically adjust the size approximately every one second.

17. The article of claim 14, further comprising instructions that, if executed, enable the system to receive information from a distance detector.

18. The article of claim 14, further comprising instructions that, if executed, enable the system to process an interrupt from the distance detector.

* * * * *